United States Patent Office 3,847,823
Patented Nov. 12, 1974

3,847,823
OVERBASED HIGH PLUS LOW MOLECULAR WEIGHT SULFONATE WATERFLOOD ADDITIVE
Charles R. Clark, M. Duane Gregory, Oliver C. Kerfoot, and Fred C. Veatch, Ponca City, Okla., Delmar D. Krehbiel, Lubbock, Tex., and Carl D. Kennedy, Ponca City, Okla., assignors to Continental Oil Company, Ponca City, Okla.
No Drawing. Filed Feb. 26, 1973, Ser. No. 335,995
Int. Cl. C09k 3/00; E21b 43/25
U.S. Cl. 252—8.55 D                    4 Claims

ABSTRACT OF THE DISCLOSURE

An overbased anionic waterflood additive comprising a water-soluble low molecular weight alkali metal hydrocarbon sulfonate having an equivalent weight of about 200 to about 400 plus a water-insoluble high molecular weight alkali metal hydrocarbon sulfonate having an equivalent weight of about 400 to about 600 plus an overbasing amount of base component such as an alkali metal hydroxide is prepared and is injected into a petroliferous formation to improve a waterflood process. Sufficient overbasing base component is employed that the ratio "Weight of excess base component/weight of sulfonate" is about 0.03 to about 2.0.

BACKGROUND OF THE INVENTION

Field of the Invention

This invention relates to an improved anionic waterflood additive composition and to use of the waterflood additive to promote the recovery of secondary and tertiary oil from a petroliferous formation.

Brief Description of the Prior Art

A large percentage of the oil in petroliferous strata is held within the rock of the strata by the surface forces between the rock, the oil, and the formation water. As a result, a substantial portion of this oil usually remains in the rock even when wells traversing the strata are no longer productive. Various secondary recovery techniques, such as thermal recovery, gas injection and waterflooding, have been suggested for the recovery of this fixed oil which remains in the formation after it can no longer be produced by primary recovery methods. Of these secondary recovery techniques, waterflooding is quite commonly chosen, and a multitude of methods have been suggested for improving the efficiency and economy obtained from the practice. Such methods frequently include incorporation of a water-soluble surfactant in the waterflood. Typical surfactants which have been proposed for this purpose include alkyl pyridinium salts, sodium lauryl sulfate, certain sulfonates, glycosides, sodium oleates, quaternary ammonium salts and the like. The use of such surfactants has arisen because it is widely recognized that a low interfacial tension between the surfactant flood water and the reservoir crude is essential to the improvement of recovery efficiencies.

Recently it has been proposed that nonionic surfactant solutions, such as a polyoxyethylene-polyoxypropylene copolymer containing solution be injected into the formation through a first of at least two well bores to thereby displace the hydrocarbons towards a second well bore. The nonionic surfactant flood is then followed by the injection of a slug of aqueous caustic into the formation through the first well bore to displace the hydrocarbon and the surfactant toward the second bore. The caustic slug has a basicity at least 1.5 pH levels greater than that of the native formation water. However, the use of the nonionic surfactant has not fully met the needs of a desirable waterflood additive surfactant composition and new compositions are constantly being sought which will allow one to recover the residual oil remaining in the formation. In addition, severe problems have been encountered in the use of many of the surfactants of the prior art when formation waters containing calcium and/or magnesium ions are encountered. One such problem is that the calcium and/or magnesium ions combine with the surfactant thus causing a precipitate to form which renders the surfactant inactive. Further, the surfactant ingredients of the prior art have suffered from a lack of availability or from high cost, and thus have not satisfied this long-felt need.

OBJECTS OF THE INVENTION

An object of the invention is to provide an improved waterflood additive.

Another object of this invention is to provide an improved method of recovering hydrocarbons from an oil bearing formation by injecting an improved waterflood additive into the formation.

SUMMARY OF THE INVENTION

According to the instant invention we have now found an improved anionic waterflood composition for use in recovering hydrocarbons from petroliferous formations. The anionic waterflood composition comprises an overbased mixture of water-soluble, low molecular weight alkali metal hydrocarbon sulfonates and oil-soluble high molecular weight alkali metal hydrocarbon sulfonates. The term overbased means that the sulfonate mixture contains an excess of base component in excess of that required to neutralize the sulfonic acid precursors of the sulfonate mixture such that the ratio: "weight of excess base component/weight of sulfonate" is about 0.03 to about 2.0.

One means of employing the anionic waterflood additive composition of the instant invention involves injecting a slug of an aqueous mixture containing about 0.5 to about 25 weight percent of the overbased sulfonate mixture into the formation to thereby displace hydrocarbons from the formation to recover the displaced hydrocarbon.

Additional hydrocarbon can be recovered, if desired, by injecting an effective amount of a slug of aqueous base component into the petroliferous formation after the overbased slug has been injected.

Another means of recovering hydrocarbons from a petroliferous formation involves injecting a first slug of an aqueous mixture containing from about 0.5 to 25 weight percent of the sulfonate mixture of water-soluble sulfonates and oil-soluble sulfonates into the petroliferous formation followed by injecting an effective amount of an aqueous base component mixture as a slug so that the overbased composition is produced in situ by the contacting of the aqueous sulfonate containing slug and the aqueous base component containing slug.

When connate waters are encountered which contain calcium or magnesium it has been found desirable that the aqueous mixture contain, in addition to the overbased sulfonate mixture, an effective amount of a chelating agent or trisodium phosphate monohydrate.

DESCRIPTION OF THE PREFERRED EMBODIMENTS

As previously stated, the present invention relates to an improved anionic waterflood additive composition and to methods of using same for the recovery of hydrocarbons from petroliferous formations. The compositions will differ in the desirability of incorporation of a chelating agent or trisodium phosphate monohydrate depending upon whether calcium and/or magnesium are present in the connate water of the formations. However, in all cases the presence of an overbased sulfonate mixture of water-soluble sulfonates and oil-soluble sulfonates in the additive composition is essential. The water-soluble sulfonates and the oil-soluble sulfonates employed to produce the overbased sulfonate mixture of the invention can be petroleum derived sulfonates, or synthetically derived sulfonates, or mixtures. The petroleum sulfonates are prepared by sulfonating a suitable refinery stream which contains hydrocarbon precursors of suitable molecular weight to produce the low molecular weight sulfonates, the high molecular weight sulfonates, or a blend of such which is suitable to produce the blend of low and high molecular weight sulfonates employed. The synthetically derived sulfonates can be prepared by numerous means, such as sulfonating alkyl aryl fractions synthesized in various chemical operations, such as the alkylation of benzene to obtain alkylates of suitable molecular weight. The sulfonation reaction employed to produce the sulfonic acid precursors of the water-soluble sulfonates and oil-soluble sulfonates is essentially the same whether petroleum sulfonates or synthetic sulfonates are to be prepared. Any suitable well-known sulfonation procedure can be employed. Thus, the sulfonating agent can be oleum, $SO_3$, mixtures of $SO_3$ and $SO_2$, chlorosulfonic acid, or the like. Furthermore, the sulfonation can be carried out by either a batch-type process or a continuous process such as a falling film sulfonation process.

The sulfonic acid precursors formed by the above mentioned sulfonation procedures are then neutralized and overbased to produce the desired overbased sulfonate mixture. The neutralization and overbasing procedure can likewise be carried out by any one of several methods known in the art. Alkali metal hydroxides are the base components employed in such neutralizing and overbasing procedure. The most desirable results are obtained when the base component is NaOH.

Overbased sulfonates, as this term is employed in this application, are defined to be mixtures of alkali metal sulfonates plus base component wherein the ratio: "weight of excess base component/weight of alkali metal sulfonate" has a value of about 0.03 to 2.0. Excess base component is that amount of base component present which is not employed to neutralize the sulfonic acid precursor to the sulfonate. Particularly desirable results are obtained when the ratio has a value of about 0.20 to about 1.0.

It is apparent that when one merely neutralizes the sulfonic acids and injects the sulfonates into the formation that one must add a sufficient amount of aqueous base component in a second slug to insure that the waterflood additive composition formed in situ in the formation is overbased in the prescribed ranges.

The anionic waterflood additive composition of the instant invention comprises an overbased sulfonate mixture of water-soluble sulfonates and oil-soluble sulfonates wherein the mixture contains an excess of the base constituent such that the ratio is about 0.03 to about 2.0. The term "water-soluble sulfonate" as used herein refers to alkali metal hydrocarbon sulfonates having an average equivalent weight of about 200 to about 400, whereas the term "oil-soluble sulfonates" refer to those alkali metal hydrocarbon sulfonates having an average equivalent weight of about 400 or more. Generally the average equivalent weight of such oil-soluble sulfonates will range from about 400 to about 600. As previously stated, the water-soluble sulfonates and the oil-soluble sulfonates can be petroleum derived sulfonates and synthetically derived sulfonates. Average equivalent weight relates to the weight of one equivalent of sulfonate moieties. It is often an approximation of molecular weight as most of the materials are often monosulfonates.

The amount of water-soluble sulfonates and oil-soluble sulfonates employed in the overbased sulfonate mixture can vary widely, but generally such are present in a ratio such that the average equivalent weight of the mixture is about 350 to 500. Especially desirable results have been obtained when the water-soluble sulfonates and the oil-soluble sulfonates are present in the sulfonate mixture such that the average equivalent weight of sulfonate mixture is about 375 to about 475. Water-soluble sulfonates and oil-soluble sulfonates having the above-described properties are well known and are commercially available. The water-soluble sulfonates are often classified as sulfonated water-soluble syndets, and such compounds are well known to those skilled in the art.

The oil-soluble (water-insoluble) sulfonates useful in the practice of this invention are those having an average equivalent weight of at least about 400 and which have relatively little or no water solubility. Such oil-soluble sulfonates can be produced by sulfonating certain mixtures of petroleum hydrocarbons obtained as refinery fractions. On sulfonation, mixtures of sulfonic acids are produced which when converted to the respective alkali metal sulfonates have average molecular weights of 400 or more. Another source of such oil-soluble sulfonates is the sulfonation product of the high molecular weight bottoms fraction resulting from the fractional distillation of the alkylation product formed during the production of water-soluble sulfonates derived from alkylation products which in turn are derived from aromatic hydrocarbons and chlorinated alkanes and the like. Examples of some oil-soluble sulfonates which can be employed include those prepared from: monoalkylbenzenes of dialkylbenzenes having molecular weights of about 300 and higher, alkylnaphthalenes of molecular weights of about 300 and higher, alkylated tetrahydronaphthalenes of 300 and higher molecular weight, and various alkylates prepared by various alkylation reactions between chlorinated alkanes, alkenes, and other such known alkylating agents and known aromatic hydrocarbons such as benzene, xylene, toluene, naphthalene and the like.

In describing the use of the anionic waterflood additive compositions of the present invention, two methods of injecting said compositions into the petroliferous strata will be discussed. However, it should be understood that the particular method employed will depend to a large extent upon the facilities available at the well site.

One method of employing the anionic waterflood additive compositions of the present invention is to inject an aqueous slug containing from about 0.5 to 25 weight percent of the neutralized sulfonate mixture through a well bore into the petroliferous subterranean strata from which the hydrocarbon is to be removed. When formation waters containing calcium and/or magnesium ions are encountered, an effective amount of a chelating agent or trisodium phosphate monohydrate is admixed with said sulfonate mixture. After the sulfonate slug has been injected into the formation, an effective amount of aqueous base component mixture in the form of a second slug, is injected into the formation to form the overbased anionic waterflood composition in situ in the subterranean formation wherein the ratio: "weight of excess base component/weight of sulfonate" is about 0.03 to about 2.0. Experimental results have shown that when employing this method, a sufficient amount of the base component containing aqueous mixture must be injected into the formation to assure that the waterflood additive will be overbased such that the ratio is about 0.03 to about 2.0. If sufficient caustic is not added to reach the lower ratio value of 0.03, minimum desirable results are not obtained. Likewise, problems have been encountered when the amount of overbasing is greater than a ratio value of about 2.0 as to viscosity and handling of the materials.

The second system which can be employed in using the anionic waterflood additive compositions of the instant invention involves producing the overbased sulfonate mixture and injecting an aqueous mixture containing from about 0.5 to 25 weight percent of the overbased sulfonate, and more preferably about 2 to about 15 weight percent of the overbased sulfonate, directly into the petroliferous subterranean formation as one slug. When the formation waters and/or flood waters contain calcium and/or magnesium, an effective amount of a chelating agent or trisodium phosphate monohydrate is preferably incorporated into the aqueous mixture. When employing this procedure, the same limitations as to ratio of overbasing of the sulfonate apply as described in the process above.

While the methods of employing the overbased sulfonates described previously have shown remarkable results in increasing oil recovery, additional tertiary oil can be recovered by injecting, subsequent to injection of the overbased sulfonate, an effective amount of an aqueous mixture of a base component selected from the alkali metal hydroxides into the formation which has previously been contacted with the overbased sulfonate composition. The amount and concentration of the aqueous alkali metal containing solution employed can vary widely. However, desirable results have been obtained wherein the concentration of the base component in the solution ranges from about 0.5 to 50 weight percent and the amount of mixture injected into the formation is from about 10 to 1000 volume percent, based on the amount of the sulfonate containing slug previously injected into the formation. The total base component injected should be such, however, that the ratio: "weight of excess base component/weight of sulfonate" is not appreciably greater than about 2.0.

Difficulties are sometimes encountered in the formation of the aqueous mixture of overbased sulfonates because of the solubility characteristics of the sulfonates. When such solubility problems are apparent, an effective amount of any suitable water-soluble solubilizing agent can be added to the aqueous mixture to mitigate such problems. The amount of water-soluble solubilizing agent can vary widely, but will generally be about 0.5 to about 25 percent by weight, based on the weight of the total aqueous overbased sulfonate composition plus aqueous solubilizing agent. Examples of some suitable water-soluble solubilizing agents include aryl sulfonates such as sodium benzene sulfonate, sodium xylene sulfonates, and the like, alcohol ethoxylates wherein the molecule contains about 30 to about 90 weight percent ethylene oxide derived moieties and the alcohol derived component contains about 2 to about 20 carbon atoms; sulfonates derived from lower olefins such as butenes and pentenes; and ethoxylated phenols such as octyl phenol ethoxylates and nonylphenol ethoxylates.

It is to be understood that any sulfonate employed as such a water-soluble solubilizing agent is not to be taken into account in determining the ratio: "weight of excess base component/weight of sulfonate."

In order to more fully explain the present invention, the following examples are given. However, it is to be understood that the examples are not intended to function as limitations on the invention as described and claimed hereafter.

EXAMPLES

A series of runs were carried out to evaluate the oil recovery properties of anionic waterflood additives of the instant invention. In each run, 12" x 2" x 2" Berea sandstone cores were evacuated under vacuum and then saturated with 5 weight percent sodium chloride brine. The brine saturated cores were reduced to irreducible water saturation with Blandol product (Blandol product is a refined white mineral oil having a viscosity of about 25 cp. at ambient temperature and is marketed by Witco Chem, a domestic supplier) and then waterflooded to residual oil saturation with a sodium chloride brine solution. The various waterflood additives were then injected into the cores, and tertiary waterflood was conducted at 40 cc./hour, a flow rate equivalent to 6-7 feet per day, to determine their effectiveness as oil recovery additives. The particular anionic waterflood additive compositions employed in each run are noted in the following Table in connection with each run. All of the oil recovery runs were conducted at 130° F., and the column entitled "ΔS" discloses the volume of additional oil produced by flooding with the anionic waterflood additive of that run as a percent of the pore volume. The column entitled "Ratio" corresponds to the ratio: "weight of excess base component/weight of sulfonate." Data are presented in the following Table I.

TABLE I

| Run No. | Surfactant and/or solubilizer | Wt. percent[1] | Equivalent wt.[3] | Surfactant and/or solubilizer | Wt. percent[1] | Equivalent wt.[3] | Average equation wt. | Injection procedure | Ratio[4] | ΔS[5] |
|---|---|---|---|---|---|---|---|---|---|---|
| 1 | Batch solvent deoiled HCGO sulfonate (Na+).[6] | 15.0 | 345 | | | | | Injected with 4% NaOH present. | 0.266 | 3.5 |
| 2 | Above plus act. sulfonate from extracted oil.[7] | 15.0 | 370 | | | | | do | 0.266 | 10.3 |
| 3 | Batch decant deoiled HCGO sulfonate (Na+).[8] | 5.0 | 370 | None (base case) | | | | Injected neutral; 2 PV-percent of 4% NaOH. | 0.8 | 6.8 |
| 4 | do.[8] | 5.0 | 370 | Bryton F-430 sulfonate.[9] | 1.7 | 430 | 383 | do | 0.6 | 9.1 |
| 5 | do.[8] | 5.0 | 370 | Bryton HY sulfonate[10] | 1.7 | 490 | 394 | do | 0.6 | 10.6 |
| 6 | do.[8] | 5.0 | 370 | Sheroscope T sulfonate.[11] | 1.7 | 525 | 400 | do | 0.6 | 13.2 |
| 7 | do.[8] | 5.0 | 370 | do.[11] | 1.7 | 525 | 400 | Injected neutral | | 4.8 |
| 8 | do.[8] | 5.0 | 370 | Sheroscope T sulfonate. | 1.7 | 525 | 400 | Injected neutral; then 2 PV percent of 4% NaOH. | 0.6 | 11.6 |
| 9 | do.[8] | 5.0 | 370 | do | 3.4 | 525 | 420 | do | 0.49 | 14.7 |
| 10 | DPA sulfonate[12] | 5.0 | 341 | Sheroscope T sulfonate.[11] | 1.7 | 525 | 400 | do | 0.6 | 7.7 |
| 11 | Batch decant deoiled HCGO sulfonate (Na+).[8] | 5.0 | 370 | Bright stock sulfonate.[13] | 1.7 | 715 | 421 | do | 0.6 | 12.7 |
| 12 | Pure SO₃ batch decant deoiled HCGO sulfonate (Na+).[8] | 5.0 | 370 | Sherosope T sulfonate. | 1.7 | 525 | 400 | do | 0.6 | 13.7 |
| 13 | Batch decant deoiled HCGO sulfonate (Na+).[8] | 5.0 | 370 | Sherosope T sulfonate. | 1.7 | 525 | 400 | Injected as is | 0.27 | 11.1 |
| 14 | do.[8] | 2.5 | 370 | Sherosope T sulfonate.[11] | 1.7 | 525 | 400 | Injected neutral; 2 PV percent of 4% NaOH. | 0.95 | 11.5 |

See footnotes at end of table.

TABLE I—Continued

| Run No. | Surfactant and/or solubilizer | Wt. percent[1] | Equivalent wt.[3] | Surfactant and/or solubilizer | Wt. percent[2] | Equivalent wt.[3] | Average equation wt. | Injection procedure | Ratio[4] | Δ[5] |
|---|---|---|---|---|---|---|---|---|---|---|
| 15 | Lake Charles Light Coker Gas Oil.[14] | 5.0 | 297 | Sherosope T sulfonate | 1.7 | 525 | 334 | do | 0.6 | 7.3 |
| 16 | Batch decant deoiled HCGO sulfonate (Na+).[8] | 5.0 | 370 | do | 1.7 | 525 | 400 | do | 0.6 | 13.5 |
| 17 | SYNR sulfonate [15] | 5.0 | 403 | do | 1.7 | 525 | 428 | do | 0.6 | 14.1 |
| 18 | Batch decant deoiled HCGO sulfonate (Na+).[8] | 1.5 | 370 | do | 1.0 | 525 | 419 | do | 1.6 | 9.2 |
| 19 | Pyronate 30 decant deoiled sulfonate (Na+).[16] | 5.0 | 360 | do | 1.7 | 525 | 391 | do | 0.6 | 6.3 |
| 20 | Light Gas Oil (from Premium Coke Operation).[17] | 5.0 | 293 | do | 1.7 | 525 | 330 | do | 0.6 | 5.5 |
| 21 | Batch decant deoiled HCGO sulfonate (Na+). | 2.5 | 370 | do | 3.4 | 525 | 446 | do | 0.68 | 14.8 |
| 22 | Ponca City Thermal Cycle Oil.[18] | 5.0 | 213 | do | 1.7 | 525 | 251 | do | 0.6 | 11.1 |

[1] Weight percent is the percent by weight of the first surfactant and/or solubilizer in the overbased aqueous mixture injected into the core.
[2] Weight percent is the percent by weight of the second surfactant and/or solubilizer in the overbased aqueous mixture injected into the core.
[3] Equivalent weight is the equivalent weight of the alkali metal hydrocarbon sulfonate (in the column headed "surfactant and/or solubilizer").
[4] Ratio is the ratio: "weight of excess base component/weight of solfonate."
[5] Δ is the volume of oil produced as a percent of pore volume by the waterflooding.
[6] Batch solvent deoiled HCGO sulfonate. Heavy coker gas is a high boiling stream which is recovered from the delayed coking unit in the refinery. It is rich in aromatic content (50–60%). Heavy coker gas oil was sulfonated with $SO_3$ in a batch reactor by introducing the dilute $SO_3$ vapor (~5% in dry air) into the hydrocarbon over a period of about one hour at 80–90° C. The reaction mixture was neutralized with aqueous NaOH. Aqueous isopropyl alcohol was then added until the final solution was about 10% active sulfonate in a 50/50 water-alcohol solvent. This solution was then extracted with portions of normal hexane three successive times to remove unsulfonated oil (and some high molecular weight oil soluble sulfonate). The remaining deoiled sulfonate solution was heated on the steam bath to evaporate the isopropyl alcohol.

Above plus activated sulfonate from extracted oil. The hexane extract from the above deoiling step was extracted with aqueous isopropyl alcohol to recover any high molecular weight sulfonate which might have been coextracted with the oil. The alcohol was then evaporated to recover the sulfonate. This recovered high molecular weight sulfonate was then blended back with the sulfonate from No. 6 recovered after deoiling to approximate the original starting sulfonate composition.

[8] Batch decant deoiled HCGO sulfonation. The HCGO sulfonation and neutralization is carried out in the same manner as described in No. 6. The neutralized product is diluted with water to about 15% active and then settled at an elevated temperature of about 80° C. for several hours. This causes a separation of unsulfonated oil which forms as an upper layer and is separated from the aqueous sulfonate layer. This technique removes about 75–80% of the total unsulfonated oil present.
[9] Bryton F-430 sulfonate. This is a so-called "natural" or "mahogany" sulfonate, the sodium salt produced as a by-product of treating a refinery lubricating oil fraction with sulfuric acid to produce white mineral oil. The sulfonate is marketed as about 62% active product in oil. It has an average equivalent weight of about 430.
[10] Bryton HY sulfonate. This is an oil soluble sulfonate sodium salt manufactured from synthetically derived alkylaromatic feedstocks. It has an average equivalent weight of about 450–470 as sodium salt.
[11] Sherosope T sulfonate. This is another "natural" oil soluble sulfonate produced as a byproduct of white oil manufacture. It has an average equivalent weight of about 500–520 as sodium salt.
[12] DPA sulfonate. DPA is the designation given for a fraction of the higher boiling bottoms byproduct of the "NALKYLENE" detergent alkylate process. Typically it has a composition as follows: Detergent range monoalkylbenze or alkyltetrahydronaphthalenes (242–288 M.W.), 30%; Diphenylalkanes (285–351 M.W.), 52%; Dialkylbenzenes (358–470 M.W.), 18%. The product was sulfonated with $SO_3$ as generally described in No. 1, except temperature was maintained at 50–70° C.
[13] Bright stock sulfonate. Bright stock is a high boiling raffinate oil from refinery solvent extraction operations for lubricating oil manufactures. The sulfonate obtained from this material would be classified as a "natural" sulfonate as opposed to a synthetically derived sulfonate. The average equivalent weight of bright stock sulfonate is about 700–1,000.
[14] Lake Charles Light Coker Gas Oil. This would be the same as described in No. 8 above except HCGO from the Continental Oil Company refinery at Lake Charles was used instead of HCGO from the Ponca City refinery of Continental Oil Company.
[15] SYNR sulfonate. An equimolar mixture of benzene and linear monoalkylbenzene (238 M.W.) was alkylated with a chlorinated normal paraffin (about 30% chlorine by weight). The resulting total alkylation product was sulfonated with oleum (20% free $SO_3$) and neutralized with NaOH. The resulting sulfonation mixture had an equivalent weight of 403 as sodium salt.
[16] Pyronate 30 decant-deoiled sulfonate. Pyronate 30 is a low molecular weight water soluble sulfonate marketed by Witco Chemical Company. It is a byproduct of a white oil refining process. The average equivalent weight is 360 as the sodium sulfonate.
[17] Light coker gas oil from Premium Coke Operation. This feedstock hydrocarbon is very similar to the regular heavy coker gas oil described in No. 1 except it is a slightly lower molecular weight material. It was sulfonated and processed similarly to that described in No. 8.
[18] Ponca City Thermal Cycle Oil. Thermal cycle oil is a high boiling hydrocarbon product stream from the thermal cracking unit in the refinery. It is fairly rich in aromatics (35–50%). It was sulfonated similarly to the procedure described in No. 8.

What is claimed is:

1. A composition comprising an overbased mixture comprising a water-soluble alkali metal hydrocarbon sulfonate plus an oil-soluble alkali metal hydrocarbon sulfonate plus a base component which is an alkali metal hydroxide; the anionic waterflood additive being sufficiently overbased that the ratio: "weight of excess base component/weight of sulfonate" is about 0.03 to about 2.0.

2. The composition of Claim 1 wherein the water-soluble sulfonate has an average equivalent weight of about 200 to about 400, the oil-soluble sulfonate has an average equivalent weight of about 400 to about 600, and the water-soluble sulfonate and oil-soluble sulfonate are present in a ratio such that the average equivalent weight of the mixture of sulfonates is about 350 to about 500.

3. The composition of Claim 2 wherein the water-soluble sulfonate and oil-soluble sulfonate are present in a ratio such that the sulfonate mixture has an average equivalent weight of about 375 to 475.

4. The composition of Claim 3 wherein the ratio is about 0.20 to about 1.0, and wherein the base component is NaOH.

References Cited

UNITED STATES PATENTS

| | | | |
|---|---|---|---|
| 2,688,035 | 8/1954 | Jacob et al. | 260—505 N |
| 2,766,276 | 10/1956 | Kolling | 260—505 N |
| 3,057,896 | 10/1962 | Schlicht et al. | 260—504 R X |
| 3,488,284 | 1/1970 | Le Sur et al. | 260—504 R X |

LELAND A. SEBASTIAN, Primary Examiner

U.S. Cl. X.R.

166—305 R; 260—504 R, 505 N